C. A. MEEKER.
Smoothing-Harrow.

No. 216,878. Patented June 24, 1879.

WITNESSES:

INVENTOR:
C. A. Meeker
BY
ATTORNEYS.

UNITED STATES PATENT OFFICE.

CHARLES A. MEEKER, OF GREEN'S FARMS, CONNECTICUT.

IMPROVEMENT IN SMOOTHING-HARROWS.

Specification forming part of Letters Patent No. 216,878, dated June 24, 1879; application filed February 27, 1879.

*To all whom it may concern:*

Be it known that I, CHARLES A. MEEKER, of Green's Farms, in the county of Fairfield and State of Connecticut, have invented a new and useful Improvement in Smoothing-Harrows, of which the following is a specification.

Figure 1:
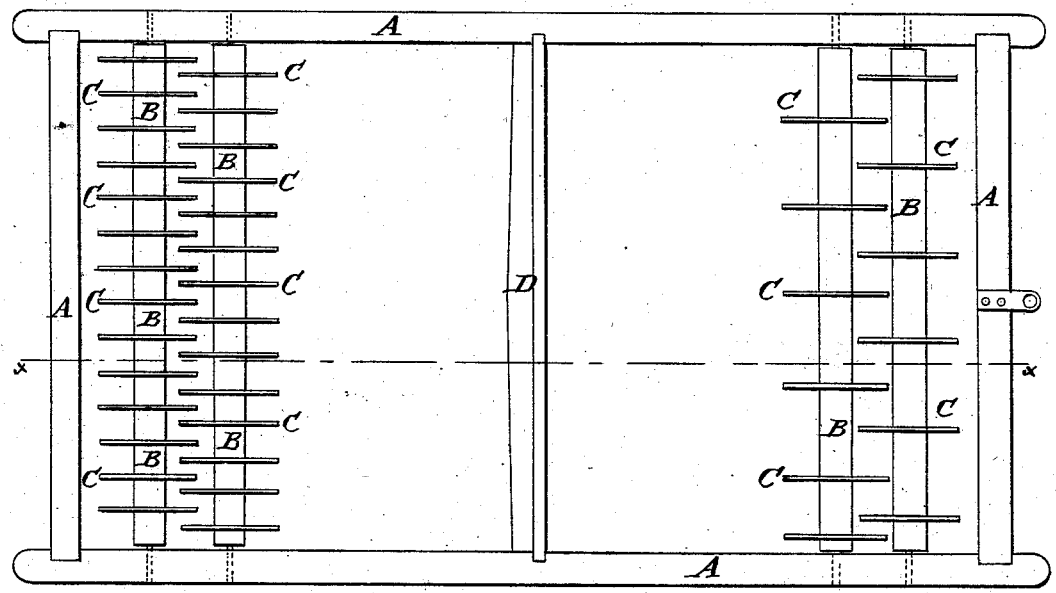
Figure 2:
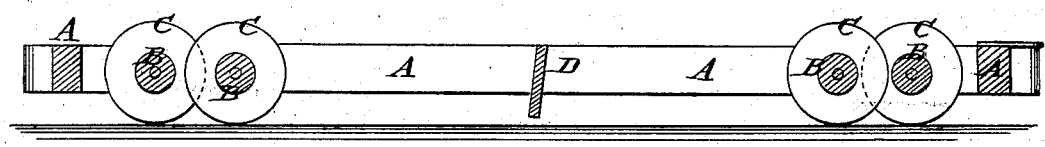
Figure 3:
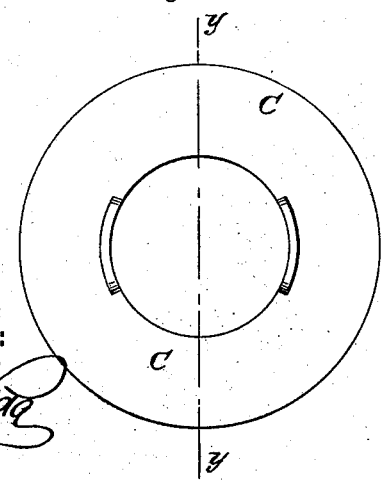
Figure 4:
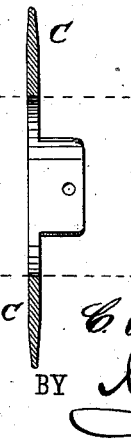

Figure 1 is a top view of my improved harrow. Fig. 2 is a longitudinal section of the same, taken through the line $x\ x$, Fig. 1. Fig. 3 is a detail side view of one of the disks. Fig. 4 is a detail cross-section of the same, taken through the line $y\ y$, Fig. 3.

Similar letters of reference indicate corresponding parts.

The object of this invention is to furnish an improved implement for leveling and smoothing the ground in preparing it to receive seed, which shall be simple in construction and effective in operation, leaving the ground so thoroughly prepared that it requires no hand-raking.

The invention consists in the combination of the two sets of rollers and disks, the disks of the rear set being placed at a less distance apart than those of the forward set, and the scraper, with the frame, as hereinafter fully described.

A represents a rectangular wooden frame, of any desired or convenient length and breadth, and to the front cross-bar of which the draft is applied. To the forward part of the side bars of the frame A are pivoted the ends of two parallel rollers, B, about four inches in diameter, and upon which are placed a number of ring-disks, C. The disks C are placed upon the rollers B, about six inches apart, and in such positions that the disks of the one roller may be opposite the center of the space between the disks of the other roller.

The rollers B are placed at such a distance apart that the edges of the disks C of each of the said rollers may almost touch the other roller.

The disks C are eight inches in diameter, so that they may project and enter the ground two inches.

To the rear parts of the side bars of the frame A are pivoted another set of rollers and disks, B C, constructed and arranged in the same way as the first set, except that the disks are placed three inches apart.

With this construction the paths of the disks of the first set will be three inches apart and the paths of the disks of the last set will be one and a half inch apart, so that all lumps and clods will be cut into pieces.

In cross-grooves in the inner sides of the side bars of the frame A are placed the ends of a board, D, which is slightly inclined, as shown in Figs. 1 and 2, so as to scrape off the surface of the higher parts of the ground and fill up the lower parts of the ground, leaving the ground level and smooth.

The disks C have laterally-projecting lugs upon the sides of their inner edges, for securing them to the rollers B.

I am aware that it is not new to smooth ground with a board, as it has been done by gardeners from time immemorial, or to cut clods with rotary knives.

I am also aware that clod-crushers have been used between sets of pulverizing toothed rollers, as well as between disk-cutters; but

What I claim is—

The combination of a front and rear set of rotary cutters, the latter closer together than the former, with an intermediate smoothing-board or scraper, D, arranged in the frame A, as shown and described, to bring the soil into a fine tilth for the reception of seeds or plants.

CHARLES AUGUSTUS MEEKER.

Witnesses:
 NELSON ALVORD,
 BURR MEEKER,
 FRANCIS RUMLEY,
 BENJAMIN F. BULKLEY.